(12) United States Patent
Yanase et al.

(10) Patent No.: US 9,388,993 B2
(45) Date of Patent: Jul. 12, 2016

(54) OUTDOOR UNIT OF AIR-CONDITIONING APPARATUS

(71) Applicant: Mitsubishi Electric Corporation, Tokyo (JP)

(72) Inventors: Tomoya Yanase, Tokyo (JP); Toshiyuki Kubono, Tokyo (JP); Kazuhiro Ooishi, Tokyo (JP); Hiroyuki Jinnai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 16 days.

(21) Appl. No.: 14/446,476

(22) Filed: Jul. 30, 2014

(65) Prior Publication Data
US 2015/0043133 A1  Feb. 12, 2015

(30) Foreign Application Priority Data

Aug. 7, 2013  (JP) .................................. 2013-164097

(51) Int. Cl.
| | | |
|---|---|---|
| *H02B 1/26* | (2006.01) | |
| *H02B 1/01* | (2006.01) | |
| *H02B 1/20* | (2006.01) | |
| *F24F 1/56* | (2011.01) | |
| *F24F 1/22* | (2011.01) | |
| *F25D 23/00* | (2006.01) | |
| *H02B 1/46* | (2006.01) | |
| *F24F 13/20* | (2006.01) | |

(52) U.S. Cl.
CPC ... *F24F 1/56* (2013.01); *F24F 1/22* (2013.01); *F25D 23/006* (2013.01); *H02B 1/46* (2013.01); *F24F 2013/207* (2013.01)

(58) Field of Classification Search
CPC ................................................... H05K 5/0247
USPC .................... 361/622, 624, 627, 637–640
See application file for complete search history.

(56) References Cited

U.S. PATENT DOCUMENTS 4,307,436 A * 12/1981 Eckart ..................... H02B 1/50
174/38
5,949,641 A * 9/1999 Walker ..................... H02B 1/20
174/70 B (Continued)

FOREIGN PATENT DOCUMENTS

| EP | 2 244 024 A1 | 10/2010 |
|---|---|---|
| EP | 2 455 674 A1 | 5/2012 |

(Continued)

OTHER PUBLICATIONS

Extended European Search Report dated Dec. 9, 2014 in the corresponding EP Application No. 14179169.9.

(Continued)

*Primary Examiner* — Anthony Haughton
(74) *Attorney, Agent, or Firm* — Posz Law Group, PLC (57) ABSTRACT

A power supply panel includes an engagement portion. An electrical component box includes a hook portion that engages with the engagement portion. A temporarily fixed state in which the power supply panel is attached to the electrical component box is set when the engagement portion engages with the hook portion.

A securely fixed state in which the power supply panel is positioned inside the outer periphery of a housing, as the housing is seen in a plan view, and the power supply panel is positioned below the electrical component box is set when the electrical component box is placed in a machine chamber and the power supply panel is attached to the housing.

9 Claims, 6 Drawing Sheets

(56) References Cited

U.S. PATENT DOCUMENTS

| | | | | |
|---|---|---|---|---|
| 6,331,933 B1 * | 12/2001 | Rumney | ............... | G06F 1/184 174/541 |
| 6,545,860 B1 * | 4/2003 | Pierce | ............... | H02B 1/305 174/17 CT |
| 6,937,461 B1 * | 8/2005 | Donahue, IV | ....... | H01R 13/514 174/50 |
| 7,599,172 B2 * | 10/2009 | Barreau | ............... | H05K 7/1432 361/622 |
| 8,305,738 B1 * | 11/2012 | Czarnecki | ............ | H02B 1/40 174/50 |
| 8,755,172 B1 * | 6/2014 | Czarnecki | ............ | H02B 1/44 361/622 |

FOREIGN PATENT DOCUMENTS

| | | |
|---|---|---|
| JP | 2951179 B | 7/1999 |
| JP | 2005-069582 A | 3/2005 |
| JP | 2006-145082 A | 6/2006 |
| JP | 2005-064114 A | 9/2006 |
| JP | 2010127536 A | 6/2010 |
| JP | 2012-137203 A | 7/2012 |

OTHER PUBLICATIONS

Japanese Office Action issued on Nov. 17, 2015 in the corresponding JP application No. 2013-164097. (English translation attached).

Japanese Office Action issued on May 10, 2016 in the corresponding JP application No. 2013-164097. (English translation attached).

* cited by examiner

OUTDOOR UNIT OF AIR-CONDITIONING APPARATUS

TECHNICAL FIELD

The present invention relates to an outdoor unit of an air-conditioning apparatus.

BACKGROUND ART

In some existing outdoor units of air-conditioning apparatuses, a power supply panel is fixed to an electrical component box with screws so as to be inclined in consideration of performing an operation of electrically connecting the power supply panel to the electrical component box and an operation of connecting indoor-outdoor connection wires (see, for example, Patent Literature 1).

CITATION LIST

Patent Literature

[Patent Literature 1] Japanese Unexamined Patent Application Publication No. 2006-145082 ([0016], FIG. 4)

SUMMARY OF INVENTION

Technical Problem

The outdoor unit of an air-conditioning apparatus described in Patent Literature 1 has good workability because the power supply panel is fixed to the electrical component box with screws so as to be inclined and the power supply panel and the electrical component box are attached to the outdoor unit. However, a wasted space is formed between the electrical component box and a side panel which constitutes the outdoor unit due to the inclined structure of the power supply panel. Therefore, the outdoor unit has a large size.

The present invention has been made in order to address the above-described problem, and has as its object to provide an outdoor unit of an air-conditioning apparatus smaller in size than the conventional outdoor unit without lowering the workability,

Solution to Problem

According to the present invention, an outdoor unit of an air-conditioning apparatus includes a housing in which a machine chamber is formed; an electrical component box disposed in the machine chamber; and a power supply panel including a terminal block to which a connection wire is attached, the connection wire being connected to an electrical component held in the electrical component box.

The power supply panel includes a first power-supply-panel-side engagement member. The electrical component box includes an electrical-component-box-side engagement member that engages with the first power-supply-panel-side engagement member. A first state in which the power supply panel is attached to the electrical component box is set when the first power-supply-panel-side engagement member and the electrical-component-box-side engagement member engage with each other. A second state in which the power supply panel is positioned inside the outer periphery of the housing, as the housing is seen in a plan view, and the power supply panel is positioned below the electrical component box is set when the electrical component box is placed in the machine chamber and the power supply panel is attached to the housing.

Advantageous Effects of Invention

According to the present invention, a first state in which the power supply panel is attached to the electrical component box is set when the first power-supply-panel-side engagement member of the power supply panel and the electrical-component-box-side engagement member of the electrical component box engage with each other. A second state in which the power supply panel is positioned inside the outer periphery of the housing, as the housing is seen in a plan view, and the power supply panel is positioned below the electrical component box is set when the electrical component box is placed in the machine chamber and the power supply panel is attached to the housing.

Therefore, the outdoor unit can be configured so that after the first power-supply-panel-side engagement member and the electrical-component-box-side engagement member are disengaged from each other, the power supply panel is positioned inside the outer periphery of the housing, as the housing is seen in a plan view, and the power supply panel is positioned below the electrical component box. Accordingly, an outdoor unit of an air-conditioning apparatus smaller in size than the conventional outdoor unit without lowering the workability can be obtained.

DESCRIPTION OF EMBODIMENTS

An example of an outdoor unit 100 of an air-conditioning apparatus according to an Embodiment of the present invention and an example of an electrical component box 16 of the outdoor unit 100 will be described in detail hereinafter with reference to the accompanying drawings. Note that the present invention is not limited to the Embodiment to be described below. In the following description, terms representing positions (for example, "above" and "below") will be used to facilitate understanding. Note, however, that these terms are used only for the sake of convenience in description and do not limit the present invention.

Figure 1:
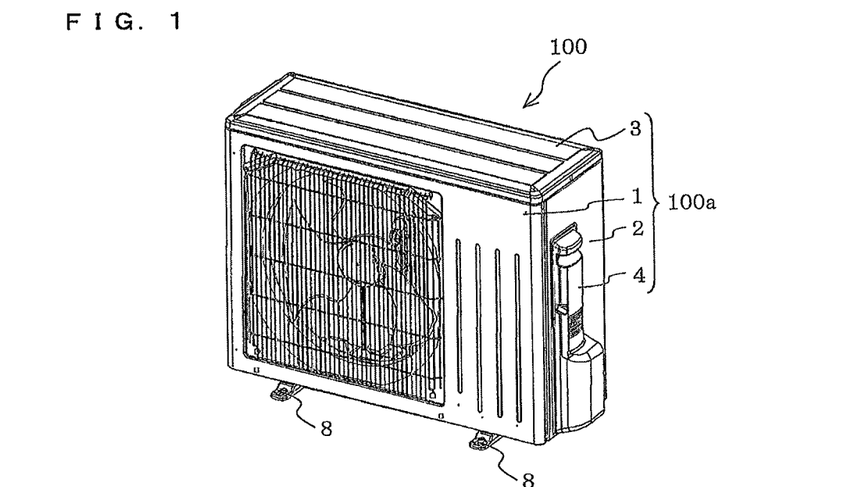
FIG. 1 is a perspective view of an outdoor unit 100 according to an Embodiment of the present invention.
Figure 2:
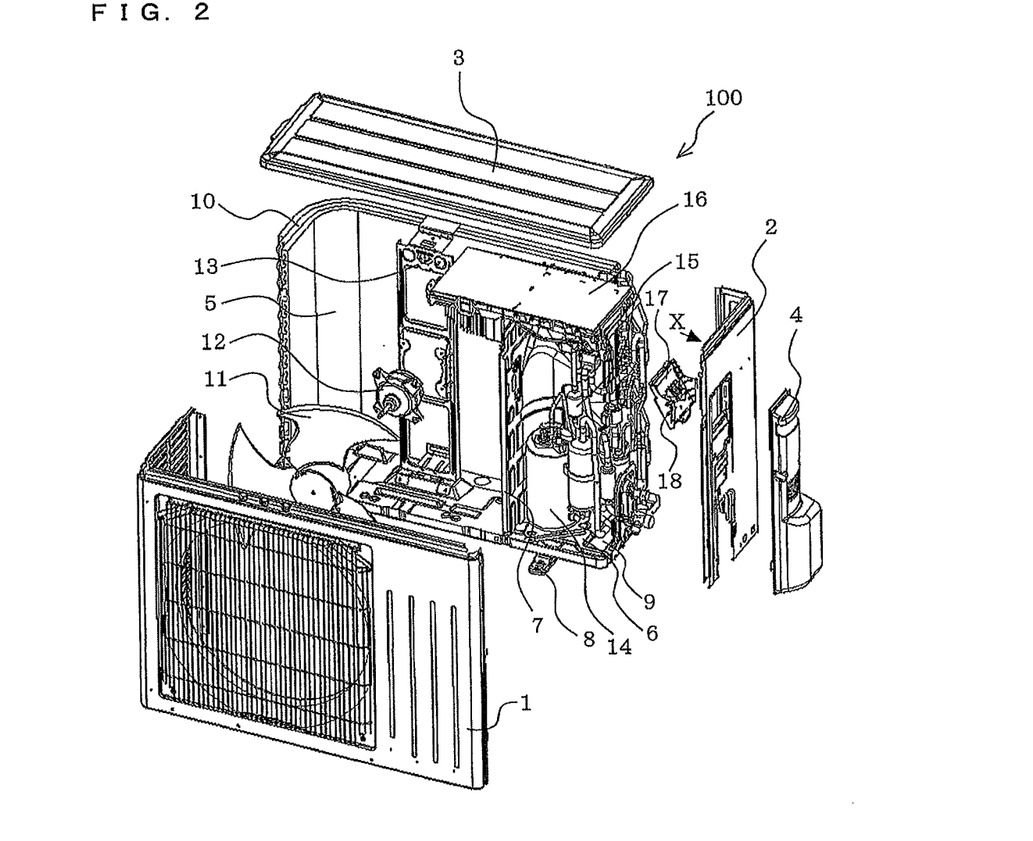
FIG. 2 is an exploded perspective view of the outdoor unit 100 according to the Embodiment of the present invention.

FIG. 1 is a perspective view of the outdoor unit 100 according to an Embodiment of the present invention. FIG. 2 is an exploded perspective view of the outdoor unit 100 according to the Embodiment of the present invention.

As illustrated in FIG. 1, the outer periphery of the outdoor unit 100 is covered with a front panel 1, a side panel 2, a top panel 3, and a protection cover 4, which constitute a housing 100a. As illustrated in FIG. 2, an inner space of the housing 100a is divided by a separator 7 into an air-sending device chamber 5 and a machine chamber 6. Components in the outdoor unit 100 are held on a bottom panel 9 having legs 8.

A heat exchanger 10, a propeller fan 11, a motor 12, and a motor mount 13 are disposed in the air-sending device chamber 5. The motor mount 13 is a member that holds the motor 12, to which the propeller fan 11 is attached. The motor mount 13 is disposed in front of the heat exchanger 10. When the propeller fan 11 rotates, air passes through the heat exchanger 10, flows into the outdoor unit 100, passes through the propeller fan 11, and is discharged to the front of the outdoor unit 100. Thus, for example, during a cooling operation, a refrigerant in the heat exchanger 10 is cooled by air, and the air passing through the heat exchanger 10 is overheated by exchanging heat with the refrigerant.

A compressor 14, a refrigerant pipe 15, the electrical component box 16, a power supply panel 17, and a terminal block 18 are disposed in the machine chamber 6. The compressor 14 compresses a refrigerant supplied from an indoor unit (not shown). The refrigerant compressed by the compressor 14 is supplied to the heat exchanger 10 through the refrigerant pipe 15. The electrical component box 16 is disposed above the compressor 14 and the refrigerant pipe 15.

The electrical component box 16 is configured to house various electrical components and supply each of the electrical components with, for example, electric power. The electrical component box 16 is made of, for example, a resin. The power supply panel 17 is disposed on the surface of the electrical component box 16, which faces the inner surface of the side panel 2. The power supply panel 17 is a member to be fitted with the terminal block 18. The power supply panel 17 is made of, for example, a resin. The terminal block 18 is a member to be connected with indoor-outdoor connection wires for connecting the outdoor unit 100 to the indoor unit. Connection wires connected to electrical components in the electrical component box 16 are attached to the terminal block 18. The terminal block 18 is fixed to the power supply panel 17 using, for example, a screw (not shown).

Figure 3:
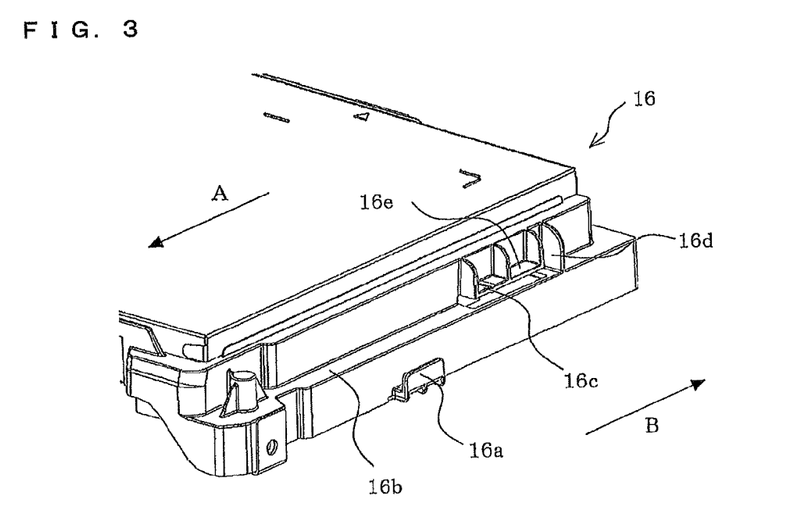
FIG. 3 is an enlarged view of the right part of an electrical component box of the outdoor unit 100 according to the Embodiment of the present invention.

FIG. 3 is an enlarged view of the right part of the electrical component box 16 of the outdoor unit 100 according to the Embodiment of the present invention.

As illustrated in FIG. 3, the electrical component box 16 includes a hook portion 16a, an electrical-component-box-side slide surface 16b, a first stopper 16c, a second stopper 16d, and a fixing piece 16e. Each of the constituent members of the electrical component box 16 will be described hereinafter. The frontward direction of the outdoor unit 100 is indicated by an arrow A, and the backward direction of the outdoor unit 100 is indicated by an arrow B. In the following description, "a state in which the power supply panel 17 is temporarily fixed to the electrical component box 16" refers to a state in which the power supply panel 17 is attached to the electrical component box 16 and upward and downward movement and forward and backward movement of the power supply panel 17 are restrained.

The hook portion 16a is configured to temporarily fix the power supply panel 17 to the electrical component box 16. For example, the hook portion 16a is an L-shaped portion extending outwards from the right side surface of the electrical component box 16 and having an end portion that protrudes upwards. The hook portion 16a is a member that restrains downward movement of the power supply panel 17 in a state in which the power supply panel 17 is temporarily fixed to the electrical component box 16. The electrical-component-box-side slide surface 16b is, for example, a horizontal surface extending in the front-to-back direction on the right side surface side of the electrical component box 16.

The first stopper 16c is a portion that restrains movement of the power supply panel 17 in the frontward direction A when the power supply panel 17 is temporarily fixed to the electrical component box 16. For example, the first stopper 16c protrudes downwards from the right side surface of the electrical component box 16. The first stopper 16c is positioned more to the back than the hook portion 16a. The first stopper 16c is positioned above the electrical-component-box-side slide surface 16b.

The second stopper 16d is a portion that restrains movement of the power supply panel 17 in the backward direction B when the power supply panel 17 is temporarily fixed to the electrical component box 16. For example, the second stopper 16d is disposed so as to stand upright from the electrical-component-box-side slide surface 16b. The second stopper 16d is positioned more to the back than the first stopper 16c.

The fixing piece 16e is a portion that restrains movement of the power supply panel 17 in a moment direction C (upward direction) (FIG. 6) when the power supply panel 17 is fixed to the electrical component box 16. For example, the fixing piece 16e is disposed above the electrical-component-box-side slide surface 16b so as to extend parallel to the electrical-component-box-side slide surface 16b.

Figure 4:
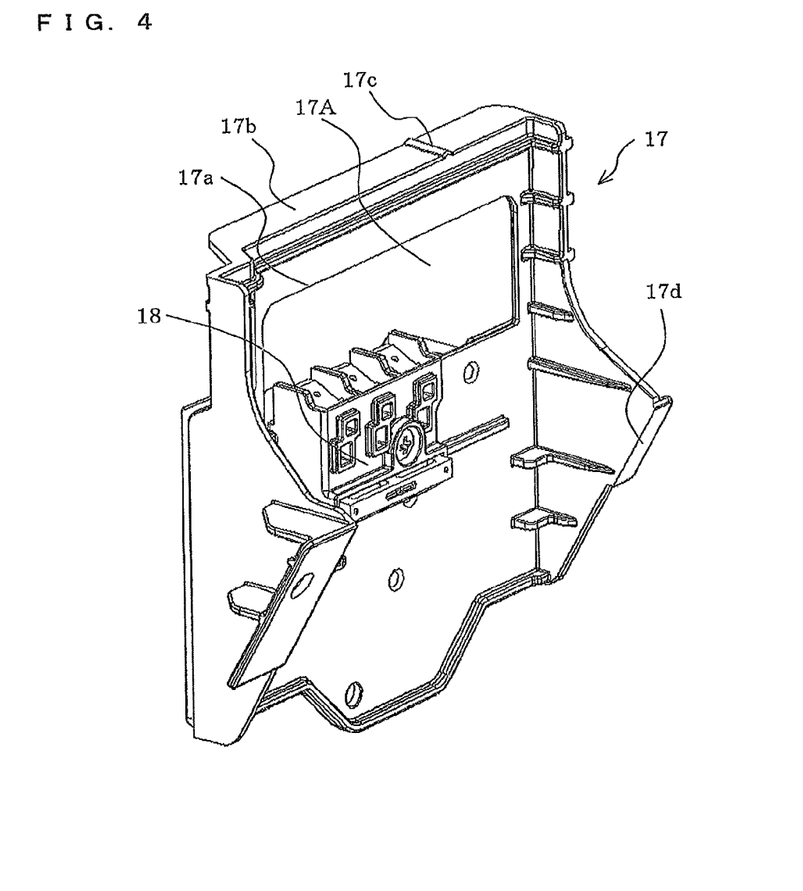
FIG. 4 is a perspective view of a power supply panel 17 on which a terminal block 18 of the outdoor unit 100 according to the Embodiment of the present invention is mounted.
Figure 5:
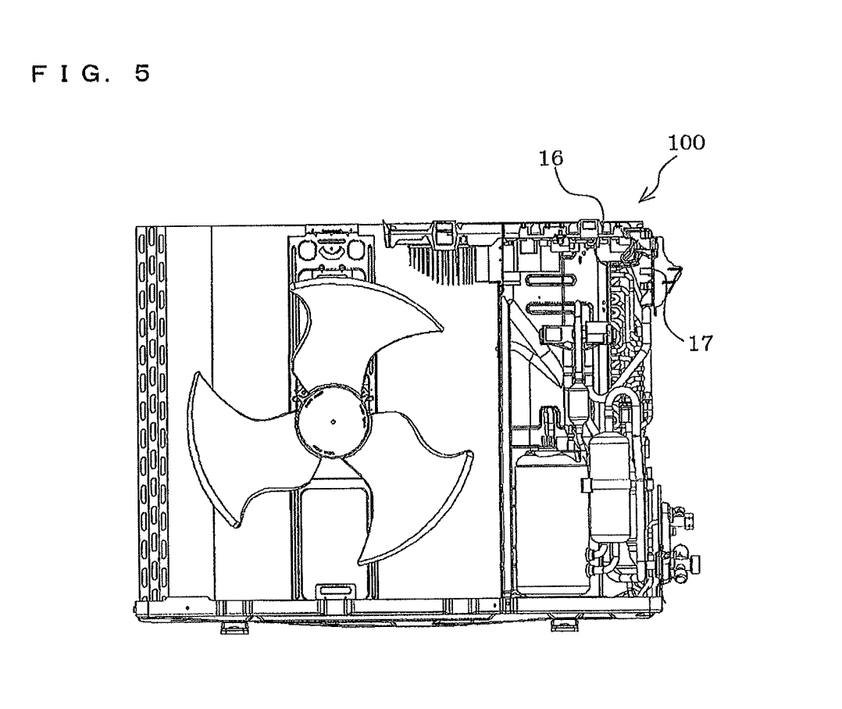
FIG. 5 is a front view showing the internal structure of the outdoor unit 100 according to the Embodiment of the present invention, and illustrates a state in which the power supply panel 17 is temporarily fixed to the electrical component box 16.

FIG. 4 is a perspective view of the power supply panel 17 on which the terminal block 18 of the outdoor unit 100 according to the Embodiment of the present invention is mounted. FIG. 5 is a front view showing the internal structure of the outdoor unit 100 according to the Embodiment of the present invention, and illustrates a state in which the power supply panel 17 is temporarily fixed to the electrical component box 16.

As illustrated in FIG. 4, the power supply panel 17 is a member for fixing the terminal block 18 in position. The power supply panel 17 includes an engagement portion 17a, a power-supply-panel-side slide surface 17b, a rib 17c, and a tab 17d. Each of the constituent members of the power supply panel 17 will be described hereinafter.

The engagement portion 17a engages with the hook portion 16a. The power-supply-panel-side slide surface 17b is a surface that comes into contact with the electrical-component-box-side slide surface 16b when the power supply panel 17 is temporarily fixed to the electrical component box 16. The power-supply-panel-side slide surface 17b is formed, for example, at the top of the power supply panel 17. The power-supply-panel-side slide surface 17b is positioned above the engagement portion 17a.

The rib 17c is a portion that restrains movement of the power supply panel 17 in the frontward direction A in a state in which the power supply panel 17 is temporarily fixed to the electrical component box 16. The rib 17c is formed on the power-supply-panel-side slide surface 17b. The details of the tab 17d will be described later.

A power supply panel opening 17A is formed in the power supply panel 17. The power supply panel opening 17A is, for example, a rectangular opening, into which the hook portion 16a of the electrical component box 16 is inserted. FIG. 5 illustrates a state in which the power supply panel 17 is temporarily fixed to the electrical component box 16 and the electrical component box 16 and the power supply panel 17 are mounted in the outdoor unit 100.

In the above description, the first stopper 16c protrudes downwards and the rib 17c protrudes upwards. However, the present invention is not limited to this. The first stopper 16c may protrude upwards and the rib 17c may protrude downwards, so that the first stopper 16c restrains forward and backward movement of the power supply panel 17.

Figure 6:
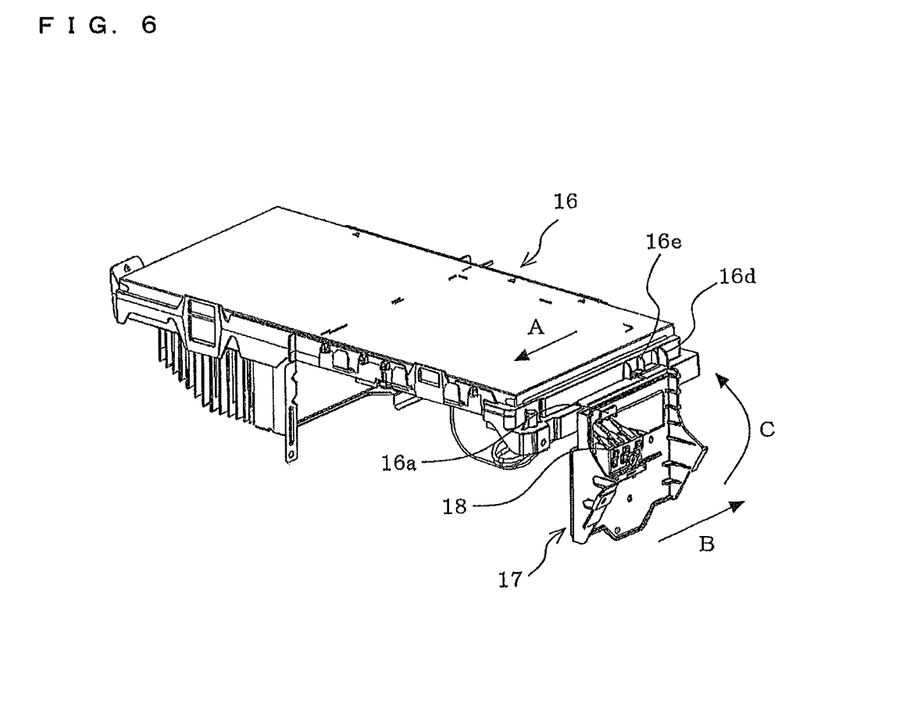
FIG. 6 is a perspective view illustrating a state in which the power supply panel 17 is temporarily fixed to the electrical component box 16 of the outdoor unit 100 according to the Embodiment of the present invention.
Figure 7:
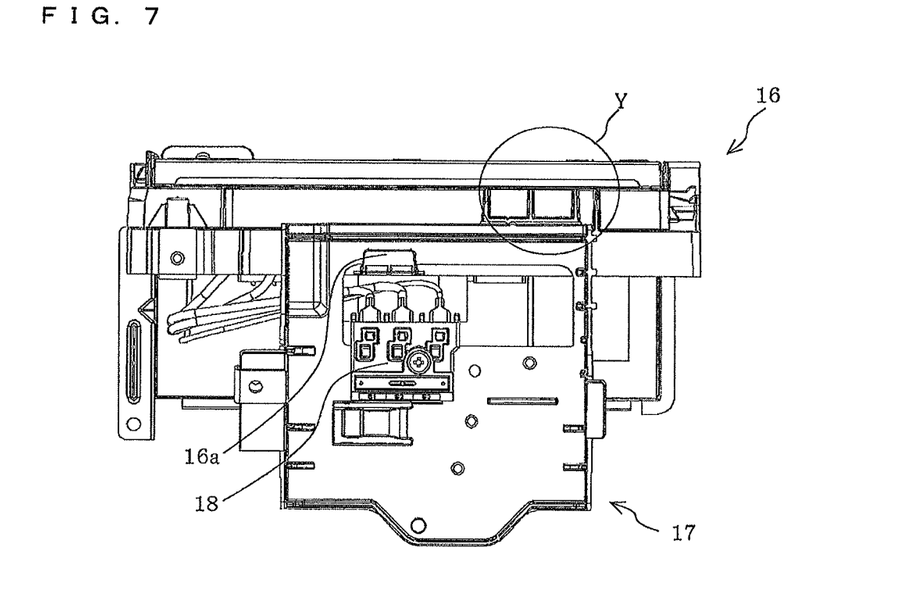
FIG. 7 is a side view of the outdoor unit 100 shown in FIG. 6.
Figure 8:
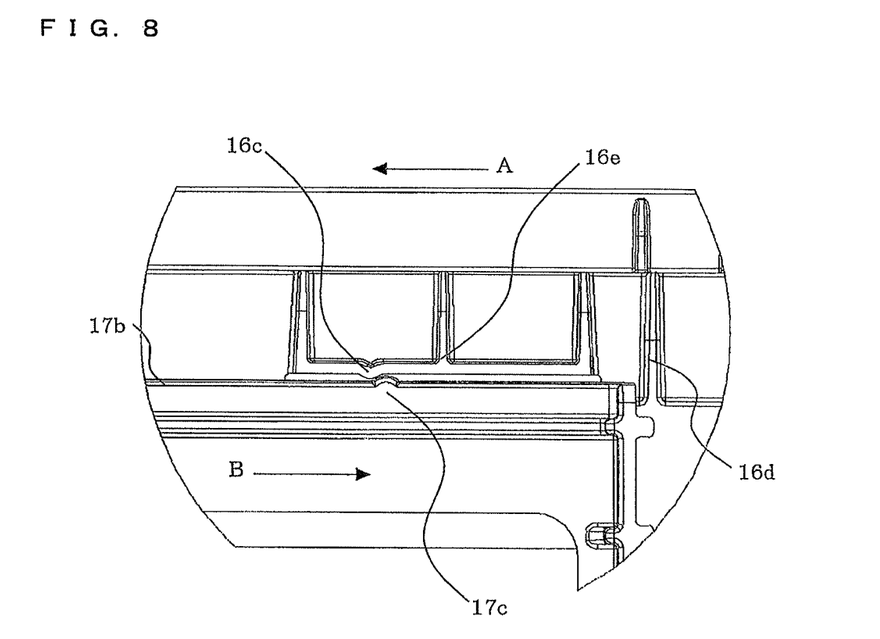
FIG. 8 is an enlarged view of a portion Y shown in FIG. 7.

FIG. 6 is a perspective view illustrating a state in which the power supply panel 17 is temporarily fixed to the electrical component box 16 of the outdoor unit 100 according to the Embodiment of the present invention. FIG. 7 is a side view of the outdoor unit 100 shown in FIG. 6. FIG. 8 is an enlarged view of a portion Y shown in FIG. 7.

The process of temporarily fixing the power supply panel 17 to the electrical component box 16 will be described hereinafter.

First, the power supply panel 17 is disposed so that a surface opposite to the power-supply-panel-side slide surface 17b abuts against the electrical-component-box-side slide surface 16b (FIG. 3). Next, the power supply panel 17 is moved by a predetermined distance (reference distance) so that the rib 17c is positioned more to the back of the outdoor unit 100 than the first stopper 16c. The thus obtained positional relationship between the power supply panel 17 and the electrical component box 16 is as shown in FIGS. 6 to 8.

At this time, the second stopper 16d is positioned more to the back than the rib 17c. Therefore, even when the power supply panel 17 falls under the influence of its own weight in the backward direction B, the second stopper 16d can restrain movement of the power supply panel 17 in the backward direction B.

Moreover, the power-supply-panel-side slide surface 17b is positioned between the electrical-component-box-side slide surface 16b and the fixing piece 16e. Therefore, even when a moment is applied to the power supply panel 17 in the moment direction C, the fixing piece 16e can restrain upward movement of the power supply panel 17.

Furthermore, the rib 17c is positioned more to the back of the outdoor unit 100 than the first stopper 16c. Therefore, even when the power supply panel 17 falls under the influence of its own weight in the frontward direction A, the first stopper 16c can restrain movement of the power supply panel 17 in the frontward direction A. Thus, the power supply panel 17 is temporarily fixed to the electrical component box 16.

For example, when the operator transports the outdoor unit 100 in a state in which the power supply panel 17 is temporarily fixed to the electrical component box 16, by applying a force greater than the self weight of the power supply panel 17 to the power supply panel 17 in the frontward direction A, the rib 17c passes over the first stopper 16c and the temporarily fixed state is released. By disengaging the hook portion 16a and the engagement portion 17a from each other in this state, the electrical component box 16 can be removed from the power supply panel 17.

Figure 9:
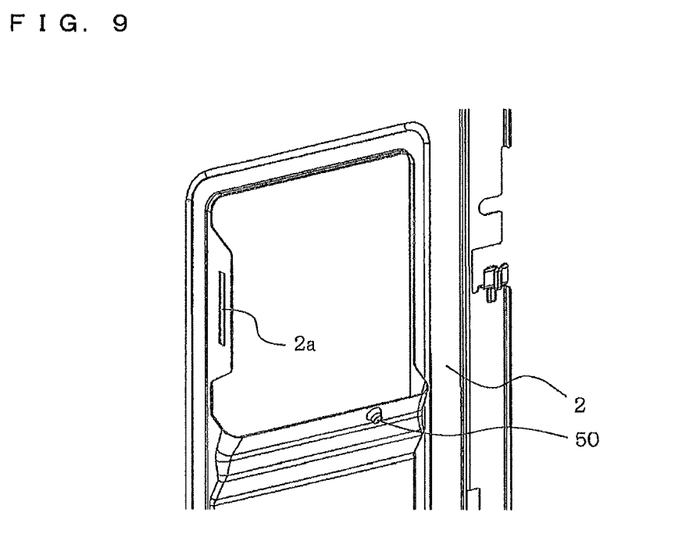
FIG. 9 is an enlarged view illustrating a side panel 2 of the outdoor unit 100 according to the Embodiment of the present invention, when viewed in the X-direction of FIG. 2.
Figure 10:
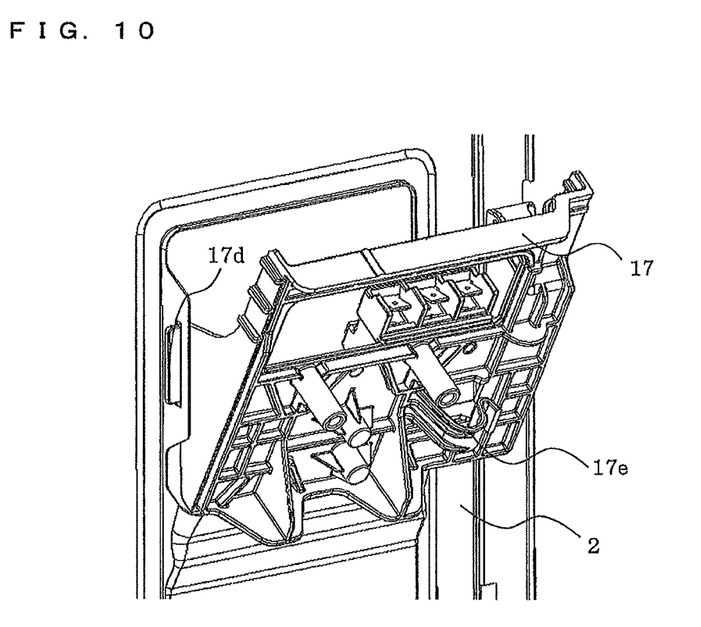
FIG. 10 is an enlarged view illustrating a state in which the power supply panel 17 of the outdoor unit 100 according to the Embodiment of the present invention is removed from the electrical component box 16 and fixed to the side panel 2.
Figure 11:
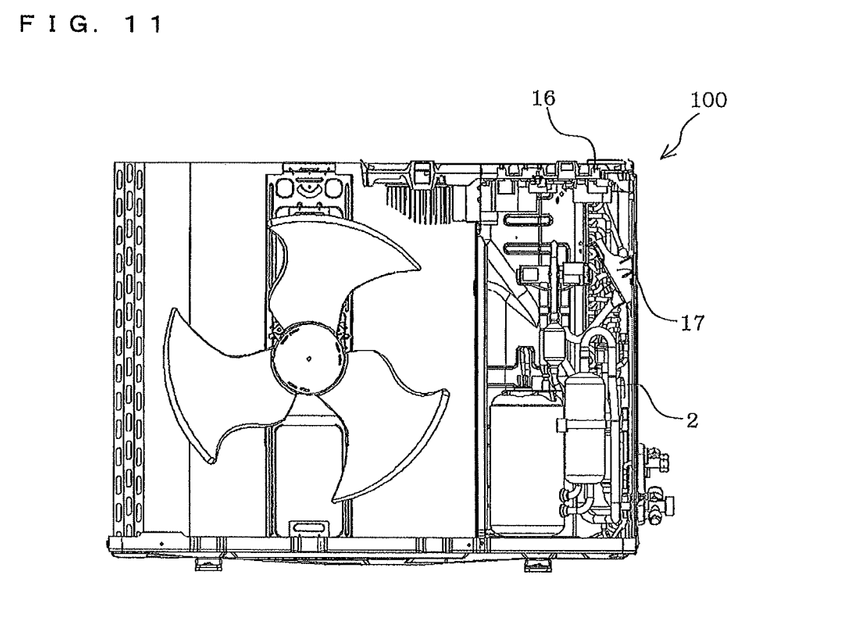
FIG. 11 is a front view illustrating a state in which the power supply panel 17 of the outdoor unit 100 according to the Embodiment of the present invention is securely fixed to the side panel 2.
Figure 12:
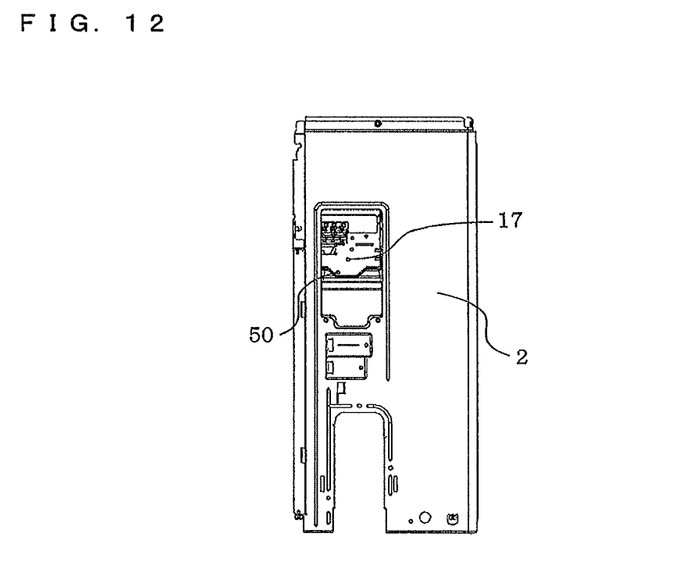
FIG. 12 is a side view showing the side panel 2 in a state in which the power supply panel 17 of the outdoor unit 100 according to the Embodiment of the present invention is attached to the side panel 2.

The direction in which the power supply panel 17 is moved is not limited to the backward direction of the outdoor unit 100 and may be the frontward direction of the outdoor unit 100. In this case, the electrical component box 16 and the power supply panel 17 are designed in such a way that the power supply panel 17 can be temporarily fixed to the electrical component box 16 by moving the power supply panel 17 in the frontward direction, FIG. 9 is an enlarged view illustrating the side panel 2 of the outdoor unit 100 according to an Embodiment of the present invention, when viewed in the X-direction of FIG. 2. FIG. 10 is an enlarged view illustrating a state in which the power supply panel 17 of the outdoor unit 100 according to the Embodiment of the present invention is removed from the electrical component box 16 and fixed to the side panel 2. FIG. 11 is a front view illustrating a state in which the power supply panel 17 of the outdoor unit 100 according to the Embodiment of the present invention is securely fixed to the side panel 2. FIG. 12 is a side view showing the side panel 2 in a state in which the power supply panel 17 of the outdoor unit 100 according to the Embodiment of the present invention is attached to the side panel 2.

As illustrated in FIG. 9, a side panel opening 2a configured to receive the tab 17d is formed in the side panel 2. A screw hole 50 configured to receive a screw so as to securely fix the power supply panel 17 to the side panel 2 is formed in the side panel 2 at a position below the side panel opening 2a. As illustrated in FIG. 10, a hook portion 17e configured to fix a lead wire is disposed on the back side of the power supply panel 17. Therefore, an operation can be performed while a lead wire is hooked to the hook portion 17e, Accordingly, an operation of connecting a lead wire can be efficiently performed. The present invention is not limited to the arrangement in which the power supply panel 17 is attached to the side panel 2, and it is only necessary that the power supply panel 17 be attached to the housing 100a.

When the tab 17d of the power supply panel 17 is inserted into the side panel opening 2a, the power supply panel 17 is inclined with respect to the side panel 2, as illustrated in FIG. 10. With such a structure in which the power supply panel 17 is inclined with respect to the side panel 2, the workability in connecting an indoor-outdoor connection wire (not shown) to the terminal block 18 can be improved.

In the state in which the tab 17d is inserted into the side panel opening 2a as illustrated in FIG. 10, the power supply panel 17 is fixed (securely fixed) to the side panel 2 with a screw, and the side panel 2 is attached to the outdoor unit 100. Then, as illustrated in FIGS. 11 and 12, the power supply panel 17 is housed in the outdoor unit 100 so as to be positioned in a space formed vertically below the electrical component box 16. When the housing 100a is viewed in a plan view, the power supply panel 17 is positioned inside the outer periphery of the housing 100a and below the electrical component box 16.

As described above, in the outdoor unit 100 of an air-conditioning apparatus according to the Embodiment, the power supply panel 17 includes the engagement portion 17a. The electrical component box 16 includes the hook portion 16a that engages with the engagement portion 17a. A temporarily fixed state in which the power supply panel 17 is attached to the electrical component box 16 is set when the engagement portion 17a engages with the hook portion 16a.

A securely fixed state in which the power supply panel 17 is positioned inside the outer periphery of the housing 100a, as the housing 100a is seen in a plan view, and the power supply panel 17 is positioned below the electrical component box 16 is set when the electrical component box 16 is placed in the machine chamber 6 and the power supply panel 17 is attached to the housing 100a. Therefore, the outdoor unit 100 can be configured so that after the engagement portion 17a and the hook portion 16a are disengaged from each other, the power supply panel 17 is positioned inside the outer periphery of the housing 100a, as the housing 100a is seen in a plan view, and the power supply panel 17 is positioned below the electrical component box 16. Accordingly, the outdoor unit 100 of an air-conditioning apparatus smaller in size than the conventional outdoor unit without lowering the workability can be obtained.

Accordingly, even when the length of the electrical component box 16 increases, it is not necessary to increase the size of the outdoor unit 100, so that the size of the outdoor unit 100 can be decreased by the space that would have been formed if the power supply panel 17 had an existing inclined structure. Thus, the size of the outdoor unit 100 can be reduced by the amount by which the power supply panel 17 is inclined, and the size of the outdoor unit 100 can be maintained the same as the conventional outdoor unit even if the size of the electrical component box 16 increases.

As described above, in the outdoor unit 100 of an air-conditioning apparatus according to Embodiment, the power supply panel 17 includes the engagement portion 17a. The electrical component box 16 includes the hook portion 16a that engages with the engagement portion 17a. A temporarily fixed state in which the power supply panel 17 is attached to the electrical component box 16 is set when the engagement portion 17a engages with the hook portion 16a. A securely fixed state in which the power supply panel 17 is positioned inside the outer periphery of the housing 100a, as the housing 100a is seen in a plan view, and the power supply panel 17 is positioned below the electrical component box 16 is set when the electrical component box 16 is placed in the machine chamber 6 and the power supply panel 17 is attached to the housing 100a. Therefore, the outdoor unit 100 can be configured so that after the engagement portion 17a and the hook portion 16a are disengaged from each other, the power supply panel 17 is positioned inside the outer periphery of the housing 100a, as the housing 100a is seen in a plan view, and the power supply panel 17 is positioned below the electrical component box 16. Accordingly, the outdoor unit 100 of an air-conditioning apparatus smaller in size than the conventional outdoor unit without lowering the workability can be obtained.

By making the engagement portion 17a and the hook portion 16a engage with each other, the operator can temporarily fix these portions to each other without supporting them with his/her hands. Therefore, the operator can perform an operation of wiring other portions in the temporarily fixed state until the power supply panel 17 is attached to the side panel 2. When fixing the power supply panel 17 to the side panel 2, the operator removes the power supply panel 17 from the electrical component box 16, and the operator can attach the power supply panel 17 to the side panel 2 by inserting the tab 17d into the side panel opening 2a. Accordingly, in contrast to existing outdoor units, it is not necessary to fix the power supply panel 17 to the electrical component box 16 with screws.

The power supply panel 17 may be made of a flame-resistant member (for example, a sheet metal), instead of a resin as described above. In this case, even if fire is produced and enters the outdoor unit 100, spreading of the fire can be suppressed.

The engagement portion 17a corresponds to a "first power-supply-panel-side engagement member" of the present invention.

The hook portion 16a corresponds to an "electrical-component-box-side engagement member" of the present invention.

The side panel opening 2a corresponds to a "side-panel-side engagement portion" of the present invention.

The tab 17d corresponds to a "second power-supply-panel-side engagement member" of the present invention.

The temporarily fixed state described above corresponds to a "first state" of the present invention.

The securely fixed state described above corresponds to a "second state" of the present invention.

REFERENCE SIGNS LIST 1 front panel, 2 side panel, 2a side panel opening, 3 top panel, 4 protection cover, 5 air-sending device chamber, 6 machine chamber, 7 separator, 8 leg, 9 bottom panel, 10 heat exchanger, 11 propeller fan, 12 motor, 13 motor mount, 14 compressor, 15 refrigerant pipe, 16 electrical component box, 16a hook portion, 16b electrical-component-box-side slide surface, 16c first stopper, 16d second stopper, 16e fixing piece, 17 power supply panel, 17A power supply panel opening, 17a engagement portion, 17b power-supply-panel-side slide surface, 17c rib, 17d tab, 17e hook portion, 18 terminal block, 50 screw hole, 100 outdoor unit, 100a housing, A frontward direction. B backward direction, C moment direction.

The invention claimed is:
1. An outdoor unit of an air-conditioning apparatus, the outdoor unit comprising:
a housing in which a machine chamber is formed, the machine chamber is adapted to have disposed therein a compressor of the air-conditioning apparatus and a refrigerant pipe of the air-conditioning apparatus;
an electrical component box disposed in the machine chamber; and
a power supply panel including a terminal block to which a connection wire is attached, the connection wire being connected to an electrical component held in the electrical component box and adapted for connection to an indoor unit of the air-conditioning apparatus,
the power supply panel including a first power-supply-panel-side engagement member, and
the electrical component box including an electrical-component-box-side engagement member that engages with the first power-supply-panel-side engagement member,
wherein a first state in which the power supply panel is attached to the electrical component box is set when the first power-supply-panel-side engagement member and the electrical-component-box-side engagement member engage with each other, and
wherein a second state in which the power supply panel is positioned inside an outer periphery of the housing, as the housing is seen in a plan view, and the power supply panel is positioned below the electrical component box is set when the electrical component box is placed in the machine chamber and the power supply panel is attached to the housing from a state in which the first state is released and the power supply panel is removed from the electrical component box.

2. The outdoor unit of an air-conditioning apparatus of claim 1,
wherein the first power-supply-panel-side engagement member is an engagement portion formed in the power supply panel,
wherein the electrical-component-box-side engagement member is a hook portion that engages with the engagement portion, and
wherein the first state is set when the engagement portion and the hook portion engage with each other.

3. The outdoor unit of an air-conditioning apparatus of claim 1, further comprising:
a side panel configured to cover the machine chamber,
wherein the power supply panel includes a second power-supply-panel-side engagement member,
wherein the side panel includes a side-panel-side engagement portion that engages with the second power-supply-panel-side engagement member, and
wherein the second state is set when the electrical component box is placed in the machine chamber, the second power-supply-panel-side engagement member engages with the side-panel-side engagement portion, and the power supply panel is attached to the housing.

4. The outdoor unit of an air-conditioning apparatus of claim 1,
wherein a space is formed inside an outer periphery of the housing, as the housing is seen in a plan view, and below the electrical component box, and wherein the second state includes a second state in which the power supply panel is positioned in the space and which is set when the electrical component box is placed in the machine chamber and the power supply panel is attached to the housing.

5. An outdoor unit of an air-conditioning apparatus, the odoor unit comprising:
a housing in which a machine chamber is formed;
an electrical component box disposed in the nmachine chamber; and
a power supply panel including a terminal block to which a connection wire is attached, the connection wire being connected to an electrical component held in the electrical component box,
the power supply panel including a first power-supply-panel-side engagement member, and
the electrical component box including an electrical-component-box-side engagement member that engages with the first power-supply-panel-side engagement member,
wherein a first state in which the power supply panel is attached to the electrical component box is set when the first power-supply-panel-side engagement member and the electrical-component-box-side engagement member engage with each other, and
wherein a second state in which the power supply panel is positioned inside an outer periphery of the housing as the housing is seen in a plan view, and the power supply panel is position below the electrical component box is set when the electrical component box is placed in the machine chamber and the power supply panel is attached to the housing,
wherein the power supply panel includes a rib,
wherein the electrical component box includes an electrical-component-box-side slide surface, a first stopper, a second stopper, and a fixing piece,
wherein the second stopper is positioned more to a side defined by a first direction than the first stopper,
wherein the electrical-component-box-side slide surface is positioned more to a side defined by a second direction than the fixing piece,
wherein the first state is set when, in a state in which the first power-supply-panel-side engagement member and the electrical-component-box-side engagement member are engaged with each other, the power supply panel slides over the electrical-component-box-side slide surface by a reference distance in the first direction and the rib passes over the first stopper, and
wherein, in the first state,
movement of the power supply panel in a direction opposite to the first direction is restrained by the first stopper,
movement of the power supply panel in the first direction is restrained by the second stopper,
movement of the power supply panel in a direction opposite to the second direction is restrained by the fixing piece, and
movement of the power supply panel in the second direction is restrained by the electrical-component-box-side engagement member.

6. The outdoor unit of an air-conditioning apparatus of claim 5,
wherein the first power-supply-panel-side engagement member is an engagement portion formed in the power supply panel,
wherein the electrical-component-box-side engagement member is a hook portion that engages with the engagement portion, and
wherein the first state is set when the engagement portion and the hook portion engage with each other.

7. The outdoor unit of an air-conditioning apparatus of claim 5, further comprising:
a side panel configured to cover the machine chamber,
wherein the power supply panel includes a second power-supply-panel-side engagement member,
wherein the side panel includes a side-panel-side engagement portion that engages with the second power-supply-panel-side engagement member, and
wherein the second state is set when the electrical component box is placed in the machine chamber, the second power-supply-panel-side engagement member engages with the side-panel-side engagement portion, and the power supply panel is attached to the housing.

8. The outdoor unit of an air-conditioning apparatus of claim 5,
wherein a space is formed inside an outer periphery of the housing, as the housing is seen in a plan view, and below the electrical component box, and wherein the second state includes a second state in which the power supply panel is positioned in the space and which is set when the electrical component box is placed in the machine chamber and the power supply panel is attached to the housing.

9. An outdoor unit of an air-conditioning apparatus, the outdoor unit comprising:
a housing in which a machine chamber that holds a compressor and a refrigerant pipe of the air-conditioning apparatus is formed;
an electrical component box disposed in an upper part of the machine chamber and holds an electrical component; and
a power supply panel including a terminal block connected to the electrical component through a connection wire, wherein the housing includes a side panel at a machine chamber side, the side panel is formed with an opening to which the power supply panel is fixed, wherein the electrical component box includes a hook provided at an upper side of the opening, and wherein the power supply panel includes:
 a base;
 a tab that is provided at a side of the base and is inserted into the opening of the side panel and fixed therein; and
 an engagement member that is provided on the base and engaged with the hook to temporarily engage the engagement member and the hook to each other.

\* \* \* \* \*